Oct. 28, 1958
A. C. STOCKER
2,858,531
RADAR SYSTEMS
Filed Dec. 16, 1955
2 Sheets-Sheet 2
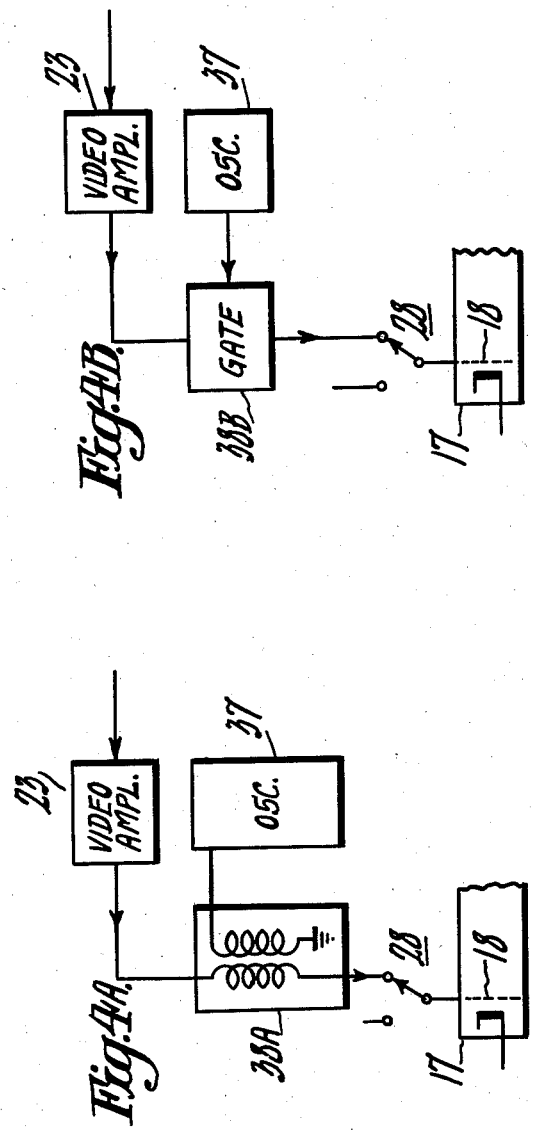
INVENTOR.
Arthur C. Stocker
BY
ATTORNEY

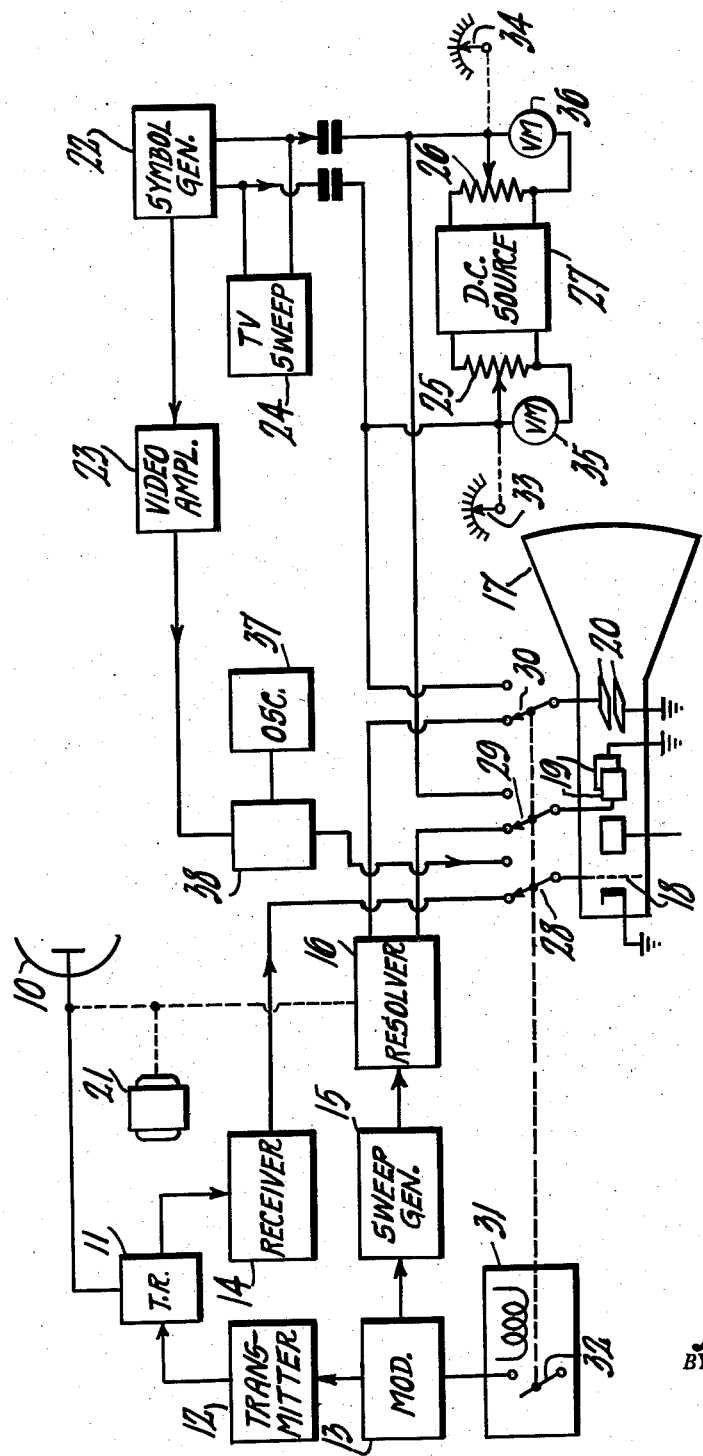

United States Patent Office

2,858,531
Patented Oct. 28, 1958

2,858,531
RADAR SYSTEMS

Arthur C. Stocker, Collingswood, N. J., assignor to Radio Corporation of America, a corporation of Delaware Application December 16, 1955, Serial No. 553,663

5 Claims. (Cl. 343—5)

This invention relates to radar systems and particularly those suited for identification or tracking of particular targets.

In accordance with the present invention, there is produced, as by television, a symbol which can be moved about on the face of the cathode ray tube of the radar for superposition upon the visual presentation of any selected target. Loss of the selected target, otherwise likely because of the superposed symbol, is avoided by imparting to the symbol a distinctive motional characteristic, such as an apparent rippling or crawling, so to afford visual contrast between the two superposed presentations.

More specifically and in a preferred embodiment of the invention, effective simultaneous presentation of the radar targets and of the tracking or identification symbol is obtained by rapidly alternately switching the grid and sweep means of the cathode ray tube to the radar receiver and to the symbol-generating system. If the symbols are generated by television, the latter includes a sweep generator and manually operable controls for effecting the aforesaid movement of the symbol about the face of the tube. To effect the aforesaid rippling or crawling motion of the symbol, the beam current of the cathode ray tube is modulated at a frequency which is non-harmonically related to either the frame or line frequency of the sweep generator.

The invention further resides in radar systems having features of composition and combination hereinafter described and claimed.

For a more detailed understanding of the invention, the following description refers to the accompanying drawings in which:

Fig. 1 is a block diagram illustrating a radar system embodying a simplified form of the invention using television;

Figs. 2A–2C are greatly enlarged views of echo and symbol presentations individually and superposed without motional contrast;

Figs. 3A to 3H comprise a series of successive enlarged views of the superposed echo and symbol which show a motional characteristics of the symbol; and Figs. 4A and 4B are fragmentary block diagrams showing modifications of a part of Fig. 1.

Referring to Fig. 1, the antenna 10, TR box 11, transmitter 12, modulator 13, receiver 14, radar sweep generator 15, resolver 16 and cathode ray tube 17 are all well known elements of a radar system and need not be described in detail. Briefly, the transmitter 12 may be a microwave oscillator, such as a magnetron or klystron; or a microwave amplifier, such as a traveling wave tube, driven by a low power microwave oscillator or by a harmonic amplifier from a lower frequency oscillator. The transmitter 12 is periodically keyed or modulated by modulator 13 to produce a train of pulses, each of relatively short duration, for example one microsecond, and occurring at relatively long intervals, for example 5000 microseconds.

During the transmission periods, the pulses are supplied to the antenna 10 through the TR box or tube 11 which serves as an automatic fast-acting transmit-receive relay. Objects in the path of the microwave energy being radiated from the antenna reflect part of the energy back to the antenna as radar echoes. During the reception periods, these echo signals are supplied through the TR box 11 to receiver 14 where they are converted to a lower frequency, amplified and supplied to the grid 18 of the cathode ray tube 17. Each of these echo signals increases the intensity of the cathode ray beam to make visible the cathode ray spot on the face of the tube.

For the PPI type of presentation, the position of the spot, in absence of any deflection field for the cathode beam, is the center of the tube face. For simplicity of explanation and illustration, it is assumed that tube 17 is of the electrostatic deflection type having pairs of deflection electrodes 19 and 20. The radar sweep-generator 15 upon termination of a transmitted pulse initiates a sweep cycle of the deflection fields so that the spot moves radially toward the outer edge of the tube face. As it so moves, the intensity or visibility of the spot is controlled by the echo signals so that the spot trace shows the objects or targets at their corresponding distances from the radar location.

The resolver 16 varies the magnitudes of the horizontal and vertical deflection fields in accordance with the position of antenna 10 so that each radial sweep trace of the cathode spot angularly corresponds with the azimuthal position of the radiated pulse beam. The motor 21 rotates the antenna 10 at suitable speed, for example, 12 revolutions per minute, so that with a cathode ray tube having a suitably high persistence phosphor, the resulting presentation on the face of the tube is a map of the area scanned by the antenna. Usually therefore, and as shown in Fig. 2A on greatly enlarged scale, each echo as it appears on the face of the tube is composed of a plurality of short segments of angularly spaced and radially extending cathode spot traces.

To facilitate tracking of a particular target moving in the scanned area, the radar sysetm of Fig. 1 additionally includes means for producing a symbol which may be superposed on the echo of that target as appearing on the face of tube 17. The symbol signal may be generated by a monoscope 22, a tube similar to the 2F21 tube usually used for providing television test patterns but here used to generate a single symbol such as the letter I. For such purpose, the symbol may be printed on the monoscope target: a more expensive and complicated arrangement for generating the symbol signal would be a television camera viewing the symbol desired to be reproduced on the face of tube 17. The symbol signal after suitable amplification by video amplifier 23 is applied, as later more fully explained, to the grid 18 of tube 17 during the transmission periods.

The deflection fields for effecting horizontal and vertical movement of the cathode ray beam in production of a television raster for the desired symbol are provided by the television sweep generator 24. The symbol signal as applied to grid 18 of tube 17 controls the cathode beam intensity during successive horizontal traces of the raster so to produce the visual symbol on the face of the tube. As shown in Fig. 2B on greatly enlarged scale, the symbol I as visually presented by the system as thus far described is composed of a vertical unbroken column of successive horizontal cathode spot traces.

The position of the symbol on the face of the tube 17 can be varied by adjusting the static values of the deflection fields. For the electrostatic-deflection tube shown, the symbol position is varied by adjustment of the direct-current potentials of the deflection electrodes 19, 20.

Specifically, the ungrounded deflection electrodes are respectively connected to the adjustable contacts of potentiometers 25, 26 supplied with direct current from a suitable source 27.

For effective simultaneous and continuous visual presentation of both the symbol and the radar echoes, the grid and deflection-electrode connections are transferred by switches 28—30 to the receiver and resolver during the period when echo signals may be expected and to the video amplifier and television sweep generator during the balance of the period preceding the next transmission. Since, as above indicated, these periods are short and follow in rapid succession, the two presentations appear simultaneously and continuously because of the persistence of vision and of the phosphor coating of the tube face. For simplicity of explanation, the switches 28—30 are shown as movable contacts of a vibrating relay 31 also having a movable contact 32 for supplying keying pulses to the modulator 13. Equivalently, these switches may be and preferably are electronic gates controlled by the pulse generator supplying the keying pulses to modulator 13.

The control knobs 33, 34 of resistors 25, 26 may be manually manipulated to move the symbol I about the face of the tube 17 into superposition (Fig. 2C) with a selected target echo. By adjusting the controls to maintain such superposition, the target may be tracked as it moves about in the area scanned by the radar beam. The static deflection voltages are a measure of the position of the target so that the positions, and changes in position, of knobs 33, 34, or the magnitudes of the corresponding voltages indicated by meters 35, 36, are indicative of the location and course of the selected target in the scanned area.

When, however, the symbol and target presentations are so superposed, it is difficult to distinguish the target—particularly when as actually viewed on the face of the tube, the presentations are on small scale and are less sharply resolved than in Fig. 2C. To permit such superposition without obscuring the target echo, the symbol signal as supplied to the grid 18 of tube 17 is modulated at a frequency which is non-harmonically related to the frequency of the sweep generator 24 and which is dephased or is different from the switching frequency. For maximum contrast, the beam of the cathode ray tube is completely interrupted during part of the modulation cycle.

Such modulation of the symbol signal may be obtained by effectively adding the output of modulation oscillator 37 to the output of video amplifier 23. This may be done (Fig. 4A) by including one winding of a coupling transformer 38A in the output of video amplifier 23 and by supplying the other winding with the modulating frequency; or as shown in Fig. 2B, an electronic gate 38B in the output circuit of video amplifier 23 may be opened and closed by the oscillator 37. Such modulation-injection arrangements are generically represented in Fig. 1 by the block 38.

Depending upon the relation between the modulating frequency and the sweep frequency of sweep generator 24, the symbol may appear to shimmer or creep while maintaining its superposed relation to the target echo. In all cases, the symbol, because of the superimposed modulation, will have a motional characteristic affording visual contrast between it and the superposed target echo. If the non-harmonic modulating frequency is widely different from any harmonic of the frequency of sweep oscillator 24, the resulting dots comprising the symbol I will move so rapidly that the eye will not see them as individual dots; but if the modulating frequency is quite nearly equal to the frequency of oscillator 24, the symbol I will have a slow crawling appearance. In the latter case, the visible trace elements of the symbol will form a continuously changing pattern which periodically repeats itself within the symbol outline as positioned by control knobs 33, 34.

As explanatory of the creeping or crawling motion, Figs. 3A to 3H are portions of successive rasters or frames produced in a short period during which the target echo T remains stationary and during which the control knobs 33, 34 remain in fixed position.

As shown by these figures, the symbol in each frame is broken up into several vertically spaced segments each comprising a group of horizontal trace elements. In the successive frames, these spaced segments of the symbol are progressively stepped downwardly. Thus when these frames follow in rapid succession, the gaps between the vertically spaced segments of the symbol appear to move across the selected echo rather than continuously obscuring it as occurs when the symbol signal is unmodulated (Fig. 2C). These gaps between the vertically spaced segments of the symbol (Figs. 3A–3H) correspond with the intervals during which the grid 18 receives no video signal from the symbol generator 22.

Thus the presence of the radar echo is not hidden by the presence of the tracking symbol.

It shall be understood that the invention is not limited to the arrangements described and illustrated and that modifications may be made within the scope of the appended claims.

What is claimed is:

1. A radar system having a cathode ray tube for visual presentation of radar echoes, means for producing a symbol signal applied to an electrode of said tube, means operable to vary the position of the resulting symbol visually presented by said tube for superposition upon a selected radar echo presentation, and modulating means for effecting apparent motion of the symbol presentation for visual contrast between the superposed presentations of the symbol and selected echo.

2. A radar system having a cathode ray tube for visual presentation of radar echoes, means for producing a symbol signal for application to a beam control electrode of said tube, a sweep generator coupled to said cathode ray tube for deflecting the cathode ray beam of said tube while said symbol signal is applied to said tube, means coupled to said sweep generator operable to vary the position of the resulting symbol visually presented by said tube for superposition upon a selected radar echo presentation, and means for modulating said symbol signal at a frequency non-harmonically related to the frequency of said sweep generator to effect apparent motion of the symbol on the selected echo in attainment of visual contrast.

3. A radar system having a cathode ray tube for visual presentation of radar echoes during radar reception intervals, means for producing a symbol signal, periodic switching means for applying said symbol signal to an electrode of said tube during times when echoes are not being received, means operable to superpose the resulting visual presentation of said symbol upon a selected echo, and modulating means for effecting apparent motion of the symbol presentation for visual contrast with respect to the selected echo.

4. A radar system having a cathode ray tube for visual presentation of echo signals respectively corresponding with radar targets, means for producing a symbol signal, switching means for applying said echo signals and said symbol signal to said tube in rapid alternation for effective simultaneous visual presentation, a sweep generator coupled to said cathode ray tube for deflecting the cathode ray beam of said tube while said symbol signal is applied to said tube, means coupled to said sweep generator operable to superpose the resulting visual presentation of the symbol upon a selected echo presentation for tracking of the corresponding target, and means for effectively modulating said symbol signal at a frequency non-harmonically related to the frequency of said sweep generator to effect apparent motion of the symbol on the selected target echo presentation.

5. A radar system having a cathode ray tube for visual presentation of echo signals respectively corresponding with radar targets comprising, means for applying a symbol signal to said cathode ray tube, means for varying the deflection fields of said tube to maintain the symbol presentation superposed upon the echo presentation corresponding with a selected moving target, and means for modulating the symbol signal to effect apparent motion of the symbol in its superposed position for visibility of the otherwise obscured selected echo presentation.

No references cited.